United States Patent [19]

Nakanishi et al.

[11] Patent Number: 5,684,113

[45] Date of Patent: Nov. 4, 1997

[54] CURABLE ORGANOPOLYSILOXANE COMPOSITION AND METHOD FOR ADHERING A SUBSTRATE TO AN ADHEREND USING THE COMPOSITION

[75] Inventors: Junji Nakanishi; Makoto Yoshitake, both of Chiba Prefecture, Japan

[73] Assignee: Dow Corning Toray Silicone Co., Ltd., Tokyo, Japan

[21] Appl. No.: 748,219

[22] Filed: Nov. 12, 1996

[30] Foreign Application Priority Data

Dec. 28, 1995 [JP] Japan .................... 7-352803

[51] Int. Cl.$^6$ ........................... C08G 77/20
[52] U.S. Cl. .................. 528/30; 528/17; 528/18; 522/99; 428/447; 427/503
[58] Field of Search ................... 528/30, 17, 18; 522/99; 427/503; 428/447

[56] References Cited

U.S. PATENT DOCUMENTS

| | | | |
|---|---|---|---|
| 4,039,504 | 8/1977 | Homan et al. | 528/30 |
| 4,528,081 | 7/1985 | Lien et al. | 528/34 |
| 4,579,636 | 4/1986 | Inoue et al. | 522/99 |
| 4,735,971 | 4/1988 | Inoue et al. | 522/42 |
| 4,742,092 | 5/1988 | Inoue et al. | 522/27 |
| 4,810,731 | 3/1989 | Hida et al. | 522/33 |
| 4,889,905 | 12/1989 | Suzuki | 528/30 |
| 5,158,988 | 10/1992 | Kurita et al. | 522/64 |
| 5,162,389 | 11/1992 | Lee et al. | 522/42 |
| 5,162,452 | 11/1992 | Herzig et al. | 525/403 |
| 5,371,116 | 12/1994 | Sakamoto et al. | 522/33 |

FOREIGN PATENT DOCUMENTS

| | | |
|---|---|---|
| 332 400 | 9/1989 | European Pat. Off. . |
| 5-295271 | 11/1993 | Japan . |
| 5-295272 | 11/1993 | Japan . |
| 6-057143 | 3/1994 | Japan . |

*Primary Examiner*—Margaret W. Glass
*Attorney, Agent, or Firm*—Roger H. Borrousch

[57] ABSTRACT

A curable organopolysiloxane composition that maintains flowability under moisture-free and light blocking conditions, more rapidly forms a nonflowable adhesive when irradiated with high energy beams such as ultraviolet rays and electron beams, and forms an elastic body by further curing when exposed to atmospheric moisture. It also involves a method for adhering a substrate to an adherend using the composition. The curable organosiloxane composition has a viscosity of 3,000 Pa.s or less and is made up of a silicone resin containing no alkenyl groups, a polydiorganosiloxane having terminal units containing a mercapto group, an alkenyl-containing organopolysiloxane, and a condensation-reaction-promoting catalyst. An assembly which has a substrates adhered to an adherend is made by spreading the composition on the substrate, irradiating it with a high energy beam, contacting the irradiated surface with an adherend, and letting it stand in air, so that the substrate is adhered to the adherend.

7 Claims, No Drawings

CURABLE ORGANOPOLYSILOXANE COMPOSITION AND METHOD FOR ADHERING A SUBSTRATE TO AN ADHEREND USING THE COMPOSITION

BACKGROUND OF THE INVENTION

1. Field of the Invention

This invention pertains to a curable organopolysiloxane composition and a method that adheres a substrate to an adherend using the composition. Specifically, it pertains to a curable organopolysiloxane composition which maintains a flowability under moisture-free and light blocking condition (no exposure to high-energy beams such as ultraviolet radiation or electron beams), rapidly forms a non-flowable adhesive by irradiation with high energy beams such as ultraviolet rays (UV) and electron beams, and forms an elastic body through a curing reaction by exposure to atmospheric moisture, and also pertains to a method of forming an assembly by adhering a substrate to an adherend using the composition.

2. Background Information (Prior Art)

Because a one-component type, room-temperature-curable (RTV) organopolysiloxane composition is excellent in heat resistance, electrical properties, and weather resistance, it is utilized in adhesives, potting agents, and coating agents. However, because a conventional one-component type, RTV organopolysiloxane composition was cured by a condensation reaction in the presence of moisture, it took a considerable amount of time to complete the curing. For this reason, compositions formed by combining a curing reaction using UV or other high energy radiation with a conventional moisture curing reaction are suggested in Japanese Kokai Patent Application Nos. Sho 60[1985]-231761 (equivalent to U.S. Pat. No. 4,579,636, issued Apr. 1, 1986, to Inoue et al), Sho 62[1987]-96562 (equivalent to U.S. Pat. No. 4,742,092, issued May 3, 1988, to Inoue et al), and Sho 62[1987]-197453 (equivalent to U.S. Pat. No. 4,735,971, issued Apr. 5, 1988, to Inoue et al), Japanese Kokoku Patent No. Hei 5[1993]-63514 (equivalent to European Patent Application Publication No. 0332,400, published Sep. 13, 1989, to Shin Etsu Chemical Co., Ltd), and Japanese Kokai Patent Application Nos. Hei 5[1993]-295271, Hei 5[1993]-295272, Hei 6[1994]-32985 (equivalent to U.S. Pat. No. 5,371,116, issued Dec. 6, 1994, to Sakamoto et al), and Hei 6[1994]-57143). These compositions exert an initial adhesion by increasing the viscosity and by solidifying after irradiation with UV, etc., when the irradiated surface makes contact with an object, adhesion is observed. However, since they had flowability, even when the viscosity of these compositions was increased, and the adhesive retention was not sufficient. When solidification occurred, the adhesion of the surface of the composition was decreased, and it was difficult to adhere an object to it.

PROBLEMS TO BE SOLVED BY THE INVENTION

The present inventors earnestly reviewed the above-mentioned problems; as a result, this invention was attained. In other words, the purpose of this invention is to provide a curable or organopolysiloxane composition that maintains flowability under moisture-free and light blocking conditions, rapidly forms a nonflowable adhesive after irradiation with high-energy beams such as UV and electron beams, and can form an elastic body by a further curing reaction when exposed to moisture in the air. It also involves a method for adhering a substrate to an adherend using the composition.

SUMMARY OF THE INVENTION

Means to solve the problems

This invention provides a curable organopolysiloxane composition comprising (A) 30–75 wt %, based on the combined weight of (A), (B), and (C) being equal to 100 wt %, of a silicone resin represented by the general unit formula $R^1_a SiO_{(4-a)/2}$ where $R^1$ is a substituted or unsubstituted monovalent hydrocarbon radical or alkoxy group and $R^1$ contains no alkenyl groups, and at least 80 mol % of $R^1$ is a monovalent hydrocarbon radical; a has an average value between 0.75 and 2.5, (B) 5–65 wt %, based on the combined weight of (A), (B), and (C) being equal to 100 wt %, of a mercapto-containing polydiorganosiloxane with a viscosity at 25° C. of 0.1–100 Pa.s and having terminal siloxy units containing a mercapto group represented by the general unit formula

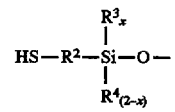

where $R^2$ is a divalent alkylene radical having 1–10 carbon atoms per radical; $R^3$ is an alkoxy group; $R^4$ is an alkyl group; and x is 1 or 2, said mercapto-containing polydiorganosiloxane does not contain alkenyl groups, (C) 5–65 wt %, based on the combined weight of (A), (B), and (C) being equal to 100 wt %, of an alkenyl-containing organopolysiloxane with a viscosity at 25° C. of 0.1–100 Pa.s and having three or more alkenyl groups in one molecule, (D) a condensation- reaction-promoting catalyst is present in an amount of 0.01–10 parts by weight per 100 parts by weight of the combined weights of components (A)–(C), and the curable organopolysiloxane composition has a viscosity at 25° C. of 3,000 Pa.s or less.

The present invention also relates to a method of spreading the above composition on a substrate, irradiating the coated substrate with a high energy beam, contacting the irradiated surface with an adherend to form an assembly, and then letting the assembly stand in contact with air whereby the substrate adheres to the adherend.

DETAIL DESCRIPTION OF THE PREFERRED EMBODIMENTS

The silicone resin, component (A), is one that promotes adhesion of the composition of this invention after irradiating it with a high energy beam. The silicone resin (A) is represented by the general unit formula $R^1_a SiO_{(4-a)/2}$, where a has an average value of from 0.75 to 2.5 and $R^1$ is a substituted or unsubstituted monovalent hydrocarbon radical or alkoxy group and contains no alkenyl group, and at least 80 mol % of $R^1$ is a monovalent hydrocarbon group. The monovalent hydrocarbon is illustrated by, for example, an alkyl radical such as methyl, ethyl, propyl, butyl, pentyl, isopropyl, isobutyl, cyclopentyl, and cyclohexyl; an aryl group such as phenyl and naphthyl; an aralkyl group such as benzyl and 1-phenylethyl; a halogenated alkyl group such as chloromethyl, 3-chloropropyl, 3,3,3-trifluoropropyl, and (perfluorobutyl)ethyl; a halogenated aryl group such as 4-chlorophenyl, 3,5-dichlorophenyl, and 3,5-difluorophenyl; or a halogenated alkaryl group such as 4-chloromethylphenyl and 4- trifluoromethylphenyl. Among these, methyl is preferable. The alkoxy group is illustrated by methoxy, ethoxy, and propoxy with methoxy being preferable. The silicone resin can be a TQ resin which is a siloxane containing in one molecule T units represented by the formula RSiO$_{3/2}$ where R is a monovalent organic radical and Q units represented by the formula SiO$_{4/2}$. The silicone resin can be an MQ resin which is a siloxane containing in one molecule M units represented by the formula R$^1_3$SiO$_1$/2 and Q units; an MTQ resin composed of M units, T units, and Q units; an MDQ resin composed of M units, Q units, and D units represented by the formula R$^1_2$SiO$_{2/2}$; an MDTQ resin composed of M units, Q units, T units, and D units; and a T resin composed of only siloxane units represented by the formula R$^1$SiO$_{3/2}$. The silicone resin represented by the general formula (R$^5_3$SiO$_{1/2}$)$_b$(SiO$_{4/2}$)$_c$ and the silicone resin represented by the general formula (R$^5_3$SiO$_{1/2}$)$_d$(R$^5$SiO$_{3/2}$)$_e$(SiO$_{4/2}$)$_f$(R$^6$O$_{1/2}$)$_g$ are preferable. Where R$^5$ is a substituted or unsubstituted monovalent hydrocarbon radical which contain no alkenyl groups. R$^6$ is an alkyl group, such as methyl, ethyl, and propyl. Also, the alkoxy group represented by the formula (R$^6$O$_{1/2}$) bonded to a silicon atom can be present in the silicone resins. In the preferred silicone resins, the ratios of b/c and d/f are in the range of 0.2/1–1.5/1, preferably 0.5/1–1.2/1, the ratio of g/f is in the range of 0.05/1–0.2/1, and the ratio of g/f is in the range of 0.05/1–0.6/1. Component (A) preferably has a number average molecular weight of 1,000–10,000, more preferably 3,000–6,000. In component (A), the organopolysiloxane of component (B) is not included.

Preferred silicone resins of component (A) are illustrated by the organopolysiloxanes represented by the following formulas where Me represents methyl:

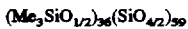

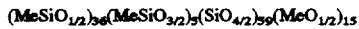

Component (B) is a mercapto containing polydiorganosiloxane having terminal siloxane units containing a mercapto group represented by the following general formula:

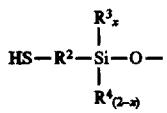

where x is 1 or 2 and R$^2$ is a divalent alkylene radical having 1–10 carbon atoms per radical, such as methylene, ethylene, propylene, isobutylene, and decylene. R$^3$ is an alkoxy group, such as methoxy, ethoxy, propoxy, isopropoxy, butoxy, and isobutoxy, preferably methoxy and ethoxy. R$^4$ is an alkyl group, such methyl, ethyl, propyl, butyl, pentyl, isopropyl, isobutyl, cyclopentyl, and cyclohexyl. The remaining units of the polydiorganosiloxane are diorganosiloxane units where the organic groups bonded to the silicon atoms are illustrated by R$^4$ defined above. The polydiorganosiloxane may also contain some organosilsesquioxane units which will provide branching. The siloxane units containing the mercapto group may be bonded at some of the terminals or at all the terminals. The viscosity of component (B) at 25° C. can be 0.1–100 Pa.s, preferably 1–80 Pa.s. The reason is that if the viscosity is less than 0.1 Pa.s, the viscosity of the composition of this invention is too low, and the composition shifts before irradiation with a high energy beam, or the adhesion is lowered after the irradiation. Also, if the viscosity is more than 100 Pa.s, the viscosity of the composition of this invention is too high, so that the spreading workability is lowered, or the adhesive retention is lowered after the irradiation with a high energy beam. The molecular structure of the polydiorganosiloxane of (B) preferably has a linear chain form, but there may be some branching. The diorganosiloxane units (D units) are illustrated by those units in which the radicals bonded to the silicon atoms are those defined by the substituted and unsubstituted monovalent hydrocarbon radicals of R$^1$ as illustrated above. Among these, methyl is preferable. The polydiorganosiloxane of (B) does not contain any alkenyl groups. The mercapto group is illustrated by mercaptopropyl and mercaptomethyl.

Component (B) can be represented by the following formulas, where Me represents methyl, Et represents ethyl, and Ph represents phenyl:

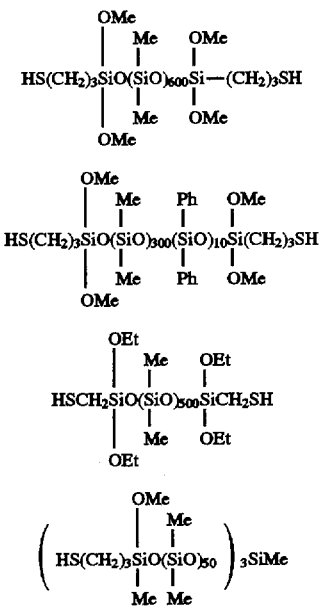

The alkenyl-containing organopolysiloxane (C) has three or more alkenyl groups in one molecule that promotes a crosslinking reaction when exposed to the irradiation with the high energy beam and improves the adhesive retention of the composition surface after irradiation. The alkenyl group can be illustrated by vinyl, allyl, and 5-hexenyl where vinyl and 5-hexenyl are preferable. Radicals bonded to the silicon atoms, other than an alkenyl group, is preferably a substituted or unsubstituted monovalent hydrocarbon. The substituted and unsubstituted monovalent hydrocarbon radicals here are illustrated above for R$^1$. Among these, methyl is preferable. The viscosity of (C) at 25° C. is 0.1–100 Pa.s, preferably 1–80 Pa.s. The reason is that if the viscosity is less than 0.1 Pa.s, the viscosity of the composition of this invention is too low, so that the composition shifts before irradiation with the high energy beam, or the adhesion is lowered after the irradiation. If the viscosity is more than 100 Pa.s, the viscosity of the composition of this invention is too high and the spreading workability is lowered, or the adhesive retention is lowered after irradiation with the high energy beam. The molecular structure of the organopolysiloxane of (C) preferably has a linear chain form, but some branching may be present.

The organopolysiloxane of component (C) are represented by the following formulas where Me represents methyl and Vi represents vinyl

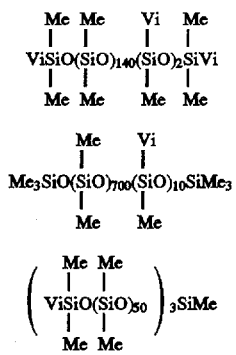

The condensation-reaction-promoting catalyst, component (D), is one that promotes a hydrolysis and condensation reaction of the alkoxy group represented by $R^3$ in component (B). Such catalysts are conventional well-known condensation-reaction-promoting catalysts which are illustrated by tetraalkoxytitanium compounds such as tetraisopropoxytitanium and tetrabutoxytitanium; titanium complex compounds such as diisopropoxybis(ethyl acetoacetate) titanium, diisopropoxybis(acetylacetone) titanium, and dibutoxybis(methyl acetoacetate) titanium; dialkyltin carboxylate compounds such as dibutyltin diacetate, dibutyltin dioctoate, and dibutyltin dilaurate; and tin carboxylate compounds such as stannous octoate. Among these, the tetraalkoxytitanium compounds and titanium complex compounds are preferable.

The amounts of the main components of the composition of this invention are 30–75 wt % of component (A), 5–65 wt % of component (B), and 5–65 wt % of component (C) where the weight percentages are based on the combined weights of (A), (B), and (C) being equal to 100 wt %; 0.01–10 parts by weight of component (D) is added to 100 parts by weight of the combined weight of (A), (B), and (C). In order to further facilitate the formation of an adhered product due to irradiation with the high energy beam such as UV and electron beams, the mole ratio of the mercapto group in component (B) to the alkenyl group in component (C) is preferably 1:2 to 5:1.

The composition of this invention comprises the above-mentioned components (A)–(D), to further facilitate the formation of an adhered product due to irradiation with the high energy beam such as UV and electron beams, a radical photopolymerization initiator, component (E), may also be added. Such a radical photopolymerization initiator includes acetophenones such as trichloroacetophenone, 2,2-diethoxyacetophenone, and 2,2-dimethoxy-2-phenylacetophenone; as well as benzophenones such as benzophenone, methylbenzophenone, p-chlorobenzophenone, and p- dimethylaminobenzophenone. The amount of radical photopolymerization initiator to be added is preferably 0.1–5 parts by weight based on the combined weights of (A), (B), and (C), more preferably 0.2–3 parts by weight based on the combined weights of (A), (B), and (C). Also, in addition, if necessary, storage stabilizers such as alkoxysilanes, fillers such as fumed silica, functional or nonfunctional organopolysiloxane gums, plasticizers, thixotropy-imparting agents, heat-resistant additives, coloring agents, and adhesion-imparting agents, can be added and mixed with the other components of the composition.

The viscosity of the composition of this invention at 25° C. is 3,000 Pa.s or less, preferably 10–2,000 Pa.s. The reason is that if the viscosity is more than 3,000 Pa.s, spreading on various kinds of substrates is difficult.

The composition of this invention can be manufactured by mixing the above-mentioned components (A)–(D) and, if necessary, component (E). However, the mixing is preferably carried out under conditions which block out light and also prevent the entrance of moisture into the composition. When it is not possible to block out all the light, oxygen is preferably used along with a dry atmosphere.

As mentioned above, the composition of this invention forms an adhered product surface that rapidly exhibits a pressure-sensitive adhesion after irradiation with the high energy beam such as UV and electron beams. The pressure-sensitive adhesion is usually maintained for about 10 minutes to 2 hours after irradiating with the high energy-beam, and a crosslinking reaction due to the action of moisture in the air promotes further the formation of an elastic body. For this reason, the composition of this invention is appropriately used as a viscous adhesive. In other words, while the pressure-sensitive adhesion is maintained, an assembly of a substrate adhered to an adherend can be formed and the strengthening of the bond between the substrate and the adherend is completed by letting it remain in air until the moisture can cause the cure to become complete. The method of this invention is characterized by the fact that after the above-mentioned composition of this invention is uniformly spread on various kinds of substrates, the surface of the composition is irradiated with a high energy beam such as UV and electron beams. Afterwards, the irradiated surface is contacted with an adherend and then left in air to complete the cure and enhance the adhesion. Various kinds of substrates, on which the composition of this invention is spread, and to which the adherend contacts includes a glass plate; a metal plate such as copper, iron, stainless steel, aluminum, and zinc; paper such as high-quality paper and straw paper in "hanshi" size; a synthetic resin or its film such as a polyester resin, polycarbonate resin, polystyrene, acryl resin, methacryl resin, and nylon resin; fiber such as natural fiber and synthetic fiber; and a rubber sheet such as natural rubber and synthetic rubber. The spreading method, for example, can be done by using a brush, bar coater, spin coater, and the like, and the amount to be spread is preferably such that the thickness of the film is 10 micrometers to 1 millimeter. The high energy beam can be UV or electron beam where the high energy beam can be from a source such as by using a high-pressure mercury lamp, xenon lamp, and metal halide lamp. The source of UV in this invention can be from a visible-light beam using sun and a fluorescent lamp as a beam source. The amount to be irradiated is preferably 20–5000 mJ/cm$^2$ for the UV and 0.5–50 Mrad for the electron beams. The adherend preferably contacts the irradiated surface in 10 minutes to 2 hours after irradiation with the high energy beam. The time left in air is usually 2 to 100 hours.

An advantage of this method is the sufficient adhesive strength obtained immediately after contacting the substrate with the adherend.

This invention is further explained in detail by application examples. In the application examples and comparative, the viscosity is measured at 25° C. Me represents methyl and Vi represents vinyl. The tensile shear adhesive strength of the curable organopolysiloxane composition was measured by the following method.

TENSILE SHEAR ADHESIVE STRENGTH

The curable organopolysiloxane composition was uniformly spread at a thickness of about 100 micrometers on a test panel made of glass with a thickness of 5 mm and a width of 2.5 cm. After letting it stand for 5 min, UV with a luminous energy of 300 mJ/cm² was irradiated onto the spread surface using a conveyer-type UV irradiating apparatus (high-pressure mercury lamp of 120 W). After the irradiation, it was left to stand for 1 min, 10 min, or 20 min, and the same test panel made of glass as in the above was placed on the irradiated surface so that the adhesion area reached 2.5 cm². After a prescribed time (5 min, 2 h, 4 h, 24 h), the tensile shear adhesive strength (kilopascals, kPa) was measured according to the method specified in JIS K6850.

APPLICATION EXAMPLE 1

71.4 g of a 70% xylene solution of a silicone resin with a number average molecular weight of 4,600 represented by the general formula $(Me_3SiO_{1/2})_{41}(SiO_{4/2})_{59}$, 45.0 g of polydimethylsiloxane having siloxane units containing a mercapto group at both terminals with a viscosity of 3.9 Pa.s represented by the general structural formula:

and 5.0 g of an organopolysiloxane containing a vinyl group with a viscosity of 1.56 Pa.s represented by the general structural formula:

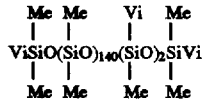

were uniformly mixed and heated under reduced pressure, so that the xylene was removed. After cooling 0.5 g of 2,2-dimethoxy-2-phenylacetophenone, 1.0 g of tetrabutoxytitanium, and 2.0 g of methyltrimethoxysilane were added and uniformly mixed under a dry atmosphere, so that a curable organopolysiloxane composition with a viscosity of 110 Pa.s was prepared. The tensile shear adhesive strength of the composition obtained was measured. At the moment, after the irradiation with UV, the time left standing was set at 1 minute. The results obtained were as shown in Table.

APPLICATION EXAMPLE 2

78.6 g of a 70% xylene solution of a silicone resin with a number average molecular weight of 3,700 represented by the general formula $(Me_3SiO_{1/2})_{45}(SiO_{4/2})_{55}$, 41.9 g of polydimethylsiloxane having siloxane units containing a mercapto group at both terminals with a viscosity of 3.9 Pa.s represented by the same general structural formula as shown in Application Example 1, and 3.1 g of an organopolysiloxane containing a vinyl group with a viscosity of 61 Pa.s represented by the general structural formula:

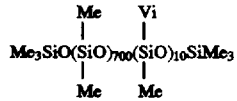

were uniformly mixed and heated under reduced pressure, so that the xylene was removed. After cooling, 0.5 g of 2,2-diethoxyacetophenone, 2.0 g of tetrabutoxytitanium, and 2.0 of methyltrimethoxysilane were added and uniformly mixed under a dry atmosphere, so that a curable organopolysiloxane composition with a viscosity of 420 Pa.s was prepared. The tensile shear adhesive strength of the composition obtained was measured. At the moment, after the irradiation with UV, the time left standing was set at 20 minutes. The results obtained were as shown in Table.

APPLICATION EXAMPLE 3

85.7 g of a 70% xylene solution of a silicone resin with a number average molecular weight of 3,500 represented by the general formula $(Me_3SiO_{1/2})_{36}(MeSiO_{3/2})_5(SiO_{4/2})_{59}(MeO_{1/2})_{15}$, 35.0 g of polydimethylsiloxane having siloxane units containing a mercapto group at both terminals with a viscosity of 3.9 Pa.s represented by the same general structural formula as shown in Application Example 1, and 5.0 g of an organopolysiloxane containing a vinyl group with a viscosity of 1.56 Pa.s represented by the general structural formula:

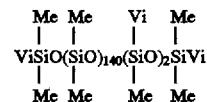

were uniformly mixed and heated under reduced pressure, so that the xylene was removed. After cooling, 1.0 g of 2,2-dimethoxy-2-phenylacetophenone and 2.0 g of diisopropoxybis(ethyl acetoacetate) titanium were added and uniformly mixed under a dry atmosphere, so that a curable organopolysiloxane composition with a viscosity of 160 Pa.s was prepared. The tensile shear adhesive strength of the composition obtained was measured. At the moment, after the irradiation with UV, the time left standing was set at 10 minutes. The results obtained were as shown in Table.

COMPARATIVE EXAMPLE 1

81.0 g of polydimethylsiloxane having siloxane groups containing a mercapto group at both terminals with a viscosity of 3.9 Pa.s represented by the same general structural formula as shown in Application Example 1, 9.0 g of an organopolysiloxane containing a vinyl group with a viscosity of 1.6 Pa.s represented by the same general structural formula as shown in Application Example 3, and 10.0 g of silica micropowder (made by Nippon Aerosil K.K.; trade name, RDX200) were uniformly mixed. Subsequently, 0.5 g of 2,2-dimethoxy-2- phenylacetophenone, 1.0 g of tetrabutoxytitanium, and 2.0 g of methyltrimethoxysilane were added and uniformly mixed under a dry atmosphere, so that a curable organopolysiloxane composition with a viscosity of 21 Pa.s was prepared. Similarly to the above-mentioned examples, UV were irradiated onto the composition surface obtained and held for 10 minutes; when an attempt was made to adhere to a test panel made of glass, they were not adhered at all. The results obtained were as shown in Table.

COMPARATIVE EXAMPLE 2

71.4 g of a 70% xylene solution of a silicone resin with a number average molecular weight of 4,300 represented by the general composition formula $(Me_3SiO_{1/2})_{42}(SiO_{4/2})_{58}$, 26.0 g of polydimethylsiloxane having siloxane units containing a mercapto group at both terminals with a viscosity of 3.9 Pa.s represented by the same general structural formula as shown for Application Example 1, and 24.0 g of an organopolysiloxane containing a vinyl group with a viscosity of 2 Pa.s represented by the general structural formula:

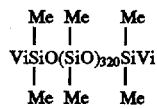

were uniformly mixed and heated under reduced pressure, so that the xylene was removed. After cooling, 0.5 g of 2,2-dimethoxy-2-phenylacetophenone, 1.0 g of tetrabutoxytitanium, and 2.0 g of methyltrimethoxysilane were added and uniformly mixed under a dry atmosphere, so that a curable organopolysiloxane composition with a viscosity of 12 Pa.s was prepared. The tensile shear adhesive strength of the composition obtained was measured. At the moment, after the irradiation with UV, the time left standing was set at 10 minutes. The results obtained were as shown in Table.

TABLE

|  | APPLICATION EXAMPLE | | | COMPARATIVE EXAMPLE | |
|---|---|---|---|---|---|
|  | 1 | 2 | 3 | 1 | 2 |
| TIME AFTER RADIATION(1) minutes | 1 | 20 | 10 | 10 | 10 |
| TENSILE SHEAR ADHESIVE STRENGTH, kPa | | | | | |
| After 5 minutes | 255 | 235 | 206 | NA(2) | 9.8 |
| After 2 hours | 333 | 216 | 314 | NA(2) | 196 |
| After 4 hours | 412 | 304 | 451 | NA(2) | 265 |
| After 24 hours | 579 | 471 | 598 | NA(2) | 373 |

(1)Time after radiation with UV until adherend (glass panel) placed on irradiated surface
(2)NA = not adhered Effect of the Invention Because the curable organopolysiloxane composition of this invention contains the above-mentioned components (A)–(D), its flowability is maintained under moisture-free and light blocking conditions, a nonflowable adhered product is more rapidly formed by irradiation with a high energy beam such as UV and electron beams. The curing reaction is further advanced by exposure to the moisture in air, and an elastic body is obtained. Also, the method of this invention uses the composition of this invention to adhere a substrate to an adherend.

That which is claimed is:

1. A curable organopolysiloxane composition comprising (A) 30–75 wt %, based on the combined weight of (A), (B), and (C) being equal to 100 wt %, of a silicone resin represented by the general unit formula $R^1_a SiO_{(4-a)/2}$ where $R^1$ is a halogen substituted or unsubstituted monovalent hydrocarbon radical or alkoxy group and $R^1$ contains no alkenyl groups, and at least 80 mol % of $R^1$ is a monovalent hydrocarbon radical; a has an average value between 0.75 and 2.5, (B) 5–65 wt %, based on the combined weight of (A), (B), and (C) being equal to 100 wt %, of a mercapto-containing polydiorganosiloxane with a viscosity at 25° C. of 0.1–100 Pa.s and having terminal siloxy units containing a mercapto group represented by the general unit formula

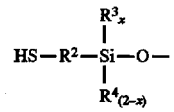

where $R^2$ is a divalent alkylene radical having 1–10 carbon atoms per radical; $R^3$ is an alkoxy group; $R^4$ is an alkyl group; and x is 1 or 2, said mercapto-containing polydiorganosiloxane does not contain alkenyl groups, (C) 5–65 wt %, based on the combined weight of (A), (B), and (C) being equal to 100 wt %, of an alkenyl-containing organopolysiloxane with a viscosity at 25° C. of 0.1–100 Pa.s and having three or more alkenyl groups in one molecule, (D) a condensation-reaction-promoting catalyst is present in an amount of 0.01–10 parts by weight per 100 parts by weight of the combined weights of components (A)–(C), and the curable organopolysiloxane composition has a viscosity at 25° C. of 3,000 Pa.s or less.

2. The curable organopolysiloxane composition of claim 1 wherein component (A) is a silicone resin represented by the general formula $(R^5_3SiO_{1/2})_b(SiO_{4/2})_c$ where $R^5$ is a halogen substituted or unsubstituted monovalent hydrocarbon radical containing no aliphatic alkenyl group; and b/c=0.2 to 1.5.

3. The curable organopolysiloxane composition of claim 1 wherein component (A) is a silicone resin represented by the general formula $(R^5_3SiO_{1/2})_d(R^5SiO_{3/2})_e(SiO_{4/2})_f(R^6O_{1/2})_g$ where $R^5$ is a halogen substituted or unsubstituted monovalent hydrocarbon radical and $R^5$ contains no alkenyl group; $R^6$ is an alkyl group; d/f=0.2 to 1.5; e/f=0.05 to 0.2; and g/f=0.05 to 0.6.

4. The curable organopolysiloxane composition of claim 1 wherein the mole ratio of the mercapto group in component (B) and the alkenyl group in component (C) is 1:2 to 5:1.

5. The curable organopolysiloxane composition of claim 1 further comprising (E) 0.1–5 parts by weight of a radical photopolymerization initiator based on 100 parts by weight of the combined weights of components (A)–(C).

6. The curable organopolysiloxane composition of claim 1 wherein the composition is a viscous adhesive.

7. A method comprising coating onto a substrate a curable organopolysiloxane composition comprising (A) 30–75 wt %, based on the combined weight of (A), (B), and (C) being equal to 100 wt %, of a silicone resin represented by the general unit formula $R^1_a SiO_{(4-a)/2}$ where $R^1$ is a halogen substituted or unsubstituted monovalent hydrocarbon radical or alkoxy group and $R^1$ contains no alkenyl groups, and at least 80 mol % of $R^1$ is a monovalent hydrocarbon radical; a has an average value between 0.75 and 2.5, (B) 5–65 wt %, based on the combined weight of (A), (B), and (C) being equal to 100 wt %, of a mercapto-containing polydiorganosiloxane with a viscosity at 25° C. of 0.1–100 Pa.s and having terminal siloxy units containing a mercapto group represented by the general unit formula

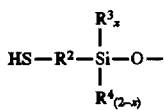

where $R^2$ is a divalent alkylene radical having 1–10 carbon atoms per radical; $R^3$ is an alkoxy group; $R^4$ is an alkyl group; and x is 1 or 2, said mercapto-containing polydiorganosiloxane does not contain alkenyl groups, (C) 5–65 wt %, based on the combined weight of (A), (B), and (C) being equal to 100 wt %, of an alkenyl-containing organopolysiloxane with a viscosity at 25° C. of 0.1–100 Pa.s and having three or more alkenyl groups in one molecule, (D) a condensation-reaction-promoting catalyst is present in an amount of 0.01–10 parts by weight per 100 parts by weight of the combined weights of components (A)–(C), and the curable organopolysiloxane composition has a viscosity at 25° C. of 3,000 Pa.s or less, to obtain a coated substrate with a curable organopolysiloxane composition surface, then irradiating the coated substrate surface with a high-energy beam to obtain an irradiated surface, and then contacting an adherend to the irradiated surface to obtain an assembly, and then letting the assembly stand in air, so that the adherend adheres to the substrate.

* * * * *